United States Patent
Ballweg et al.

(10) Patent No.: US 9,800,125 B2
(45) Date of Patent: Oct. 24, 2017

(54) RELUCTANCE ROTOR WITH MECHANICAL STABILIZING

(71) Applicant: SIEMENS AKTIENGESELLSCHAFT, München (DE)

(72) Inventors: Marion Ballweg, Bundorf (DE); Klaus Büttner, Hollstadt (DE); Klaus Kirchner, Ostheim (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 0 days.

(21) Appl. No.: 15/300,422

(22) PCT Filed: Mar. 13, 2015

(86) PCT No.: PCT/EP2015/055339
§ 371 (c)(1),
(2) Date: Sep. 29, 2016

(87) PCT Pub. No.: WO2015/150055
PCT Pub. Date: Oct. 8, 2015

(65) Prior Publication Data
US 2017/0179801 A1    Jun. 22, 2017

(30) Foreign Application Priority Data
Mar. 31, 2014 (EP) ..................... 14162700

(51) Int. Cl.
*H02K 19/14* (2006.01)
*B60L 11/18* (2006.01)
*H02K 1/22* (2006.01)

(52) U.S. Cl.
CPC ........... *H02K 19/14* (2013.01); *B60L 11/18* (2013.01); *H02K 1/22* (2013.01); *B60L 2220/50* (2013.01)

(58) Field of Classification Search
CPC  H02K 19/14; H02K 1/22; H02K 1/27; H02K 1/2706; H02K 21/00; H02K 21/12; B60L 11/18; B60L 2220/50
(Continued)

(56) References Cited

U.S. PATENT DOCUMENTS 4,365,178 A * 12/1982 Lenz ................ H02K 1/32
310/216.053
4,439,704 A * 3/1984 Adelski ............ H02K 1/2773
310/183

(Continued)

FOREIGN PATENT DOCUMENTS

GB     2 310 544 A    8/1997
JP     H09191618 A    7/1997
(Continued)

*Primary Examiner* — Michael Andrews
(74) *Attorney, Agent, or Firm* — Henry M. Feiereisen LLC

(57) ABSTRACT

A reluctance rotor for an electric machine includes rotor lamination layers made of a ferromagnetic material, wherein each rotor lamination layer has a flux barrier formed by a recess in the rotor lamination layer. In order to toughen the reluctance rotor for a high torque and a high rotational speed, the reluctance rotor has an intermediate part with recesses arranged between a first and a second rotor lamination layer, and separators delimiting the recesses from one another. The recesses of the intermediate part and the separators are arranged axially between the flux barriers, wherein the recesses of the intermediate part and the flux barriers together delimit a space. The space is cast with a non-ferromagnetic casting compound.

15 Claims, 9 Drawing Sheets

(58) Field of Classification Search
USPC .. 310/162, 43, 156.22, 156.23, 156.57, 156, 310/216
See application file for complete search history.

(56) References Cited

U.S. PATENT DOCUMENTS

| | | |
|---|---|---|
| 5,818,140 A | 10/1998 | Vagati |
| 8,963,394 B2 | 2/2015 | Büttner et al. |
| 9,257,883 B2 | 2/2016 | Büttner et al. |
| 9,281,728 B2 | 3/2016 | Büttner et al. |
| 9,287,754 B2 | 3/2016 | Büttner et al. |
| 2002/0084703 A1* | 7/2002 | Bunker ............... H02K 1/20 310/64 |
| 2002/0089251 A1 | 7/2002 | Tajima et al. |
| 2003/0071525 A1* | 4/2003 | Tong ................. H02K 1/20 310/65 |
| 2007/0096588 A1 | 5/2007 | Kirchner et al. |
| 2012/0133236 A1 | 5/2012 | Büttner et al. |
| 2012/0169158 A1 | 7/2012 | Büttner et al. |
| 2012/0187796 A1 | 7/2012 | Büttner et al. |
| 2012/0222289 A1 | 9/2012 | Nagai |
| 2013/0234543 A1 | 9/2013 | Büttner et al. |
| 2013/0257197 A1 | 10/2013 | Büttner et al. |
| 2014/0217840 A1 | 8/2014 | Büttner et al. |
| 2015/0042185 A1 | 2/2015 | Büttner et al. |
| 2015/0207378 A1 | 7/2015 | Büttner et al. |
| 2015/0214810 A1 | 7/2015 | Büttner et al. |
| 2015/0349616 A1 | 12/2015 | Büttner et al. |

FOREIGN PATENT DOCUMENTS

| | | |
|---|---|---|
| JP | H09261930 A | 10/1997 |
| JP | 2001-238418 A | 8/2001 |
| WO | WO 2011-018119 A1 | 2/2011 |

\* cited by examiner

RELUCTANCE ROTOR WITH MECHANICAL STABILIZING

CROSS-REFERENCES TO RELATED APPLICATIONS

This application is the U.S. National Stage of International Application No. PCT/EP2015/055339, filed Mar. 13, 2015, which designated the United States and has been published as International Publication No. WO 2015/150057 and which claims the priority of European Patent Application, Serial No. 14162700.0, filed Mar. 31, 2014, pursuant to 35 U.S.C. 119(a)(d).

BACKGROUND OF THE INVENTION

The invention relates to a rotor for a reluctance rotor, a reluctance motor comprising such a rotor and a motor vehicle. The rotor comprises a plurality of individual laminations which are electrically insulated from one another and which are stacked to form a laminated core.

A rotor for a reluctance motor is disclosed in U.S. Pat. No. 5,818,140 A. The rotor described therein comprises a laminated core consisting of layered rotor laminations which comprise recesses, for example stamped-out portions. Said rotor in this case is also denoted a Vagati rotor. The stamped-out portions produce curved, strip-shaped lamination portions which serve as flux-conducting portions and conduct the magnetic flux in the manner required for providing the reluctance of the rotor. Due to the stamped-out portions air is located between the individual flux-conducting portions, i.e. a non-magnetic region which acts as a magnetic flux barrier. The reactance of the laminated core in the direction of the q-axis, i.e. the magnetic blocking direction, is relatively low due to the non-magnetic regions. The strip shaped flux-conducting portions extend transversely to the q-axis and connect poles of the rotor, which are adjacent in the peripheral direction, i.e. the d-axes.

The recesses for forming the flux barriers lead to a weakening of the mechanical stability of the laminated core so that the disclosed reluctance rotor is not suitable for high rotational speeds, in particular not for rotational speeds greater than 3000 revolutions/minute. For this reason current reluctance rotors of the disclosed type are not suitable for the rotational speed requirement in the field of motor vehicles with electric drives.

A high torque output results, however, from the strip-shaped flux-conducting portions.

Disclosed in the document JP 2001 238418 A is a reluctance rotor comprising a rotor laminated core which may comprise an intermediate part made of a non-ferromagnetic material and which has flux barriers which are cast with aluminum or synthetic resin. End rings may also be cast from the aluminum at the axial ends of the rotor.

SUMMARY OF THE INVENTION

The object of the invention is to specify a reluctance rotor of the type described in the introduction which permits both a high torque and a high rotational speed so that it is suitable, in particular, as a component of an electric drive for an electric vehicle.

According to one aspect of the present invention, the object is achieved by a reluctance rotor for an electric machine, including a laminated core with rotor lamination layers made of a ferromagnetic material, wherein each rotor lamination layer has a flux barrier formed by a recess in the ferromagnetic material, wherein the reluctance rotor has an intermediate part with recesses arranged between a first and a second of the rotor lamination layers, and separators delimiting the recesses from one another, wherein the recesses of the intermediate part and the separators are axially arranged between the flux barriers and, as a result, the recesses of the intermediate part and the flux barriers together delimit a space and the space is cast with a non-ferromagnetic casting compound, wherein clamping elements are provided which are separate from one another and integrally formed from the casting compound at one axial end or at both axial ends of the reluctance rotor, the clamping elements bearing against the axial end in an overlapping region on the laminated core and, in cooperation with the casting compound in the filled-up space, holding together the rotor lamination layersrotor lamination layers each having a flux barrier formed by a recess in the rotor lamination layer.

According to another aspect of the present invention, the object is achieved by a motor vehicle including a reluctance motor, as set forth above, and provided as a drive motor for moving the motor vehicle, with the reluctance motor including a stator with coils for rotating the reluctance rotor at a rotational speed by an alternating supply of current to the coils.

Advantageous developments of the invention are disclosed from the features of the subclaims.

The rotor according to the invention is also configured as a reluctance rotor according to the Vagati principle, i.e. it comprises rotor lamination layers made of a ferromagnetic material, wherein each rotor lamination layer is formed from one or more rotor laminations and has at least one flux barrier formed by a recess in the rotor lamination layer. Naturally, each rotor lamination layer may also comprise a plurality of flux barriers. For the sake of clarity, only one individual flux barrier of each rotor lamination layer is described hereinafter. The embodiments, however, also relate to rotor lamination layers with a plurality of flux barriers.

In the reluctance rotor an intermediate part is arranged between a first and a second rotor lamination layer. This intermediate part may, for example, be cylindrical or disk-shaped, i.e. have the basic shape of one of the rotor lamination layers. The intermediate part has recesses and the recesses comprise separators defining the recesses from one another. By means of the separators the intermediate part is more mechanically stable than the two adjacent rotor lamination layers which may have fewer or narrower separators or no separators at all. The recesses of the intermediate part and the separators thereof are arranged between the two lamination layers such that they are located between the flux barriers of the two adjacent rotor lamination layers. As a result, the recesses of the intermediate part and the flux barriers, which also represent recesses in the rotor lamination layers, together form a space. This space delimited by the recesses is cast with a non-ferromagnetic casting compound. 'Non-ferromagnetic' is understood here that the casting compound, for example, may have only paramagnetic and/or diamagnetic properties or entirely non-magnetic properties. In particular, the casting compound is not soft magnetic.

The casting compound may be introduced into the reluctance rotor, for example, by injection-molding or casting of the space. Since in this case the flux barriers and the recesses of the intermediate part represent communicating hollow spaces, the casting compound may be introduced at one end of the reluctance rotor and spread out from the end into the space. Thus the production is particularly simple. Preferably a contour of the total surface area of the recesses of the intermediate part and the separators together corresponds to the contour of the adjacent flux barriers. This results in the advantage that when casting or injection-molding the space with casting compound, no air remains trapped at the edges of the recesses.

The separators form a mechanical reinforcement of the reluctance rotor. The cured casting compound in this case transmits centrifugal forces which, with a corresponding rotation of the reluctance rotor, act from the rotor lamination layers to the intermediate part so that the rotor lamination layers are also mechanically stabilized.

The separators are preferably designed to divert the centrifugal force radially inwardly in the intermediate part. A particularly effective force guidance results when each separator in its longitudinal extent extends toward an outer circumference of the reluctance rotor. Then the centrifugal forces are transmitted as pulling forces along the longitudinal extent of the separators to the interior of the reluctance rotor toward the shaft.

It is particularly advantageous if each separator in its longitudinal extent respectively extends at an acute angle or parallel to a q-axis of the reluctance rotor. Due to the disclosed path of the flux barriers, the rotor lamination layers are particularly fragile along the q-axes so that by the alignment of the separators along the q-axes the stabilizing effect is particularly high.

A further improvement of the mechanical stabilizing results when a material of the intermediate part has a greater tensile strength than the ferromagnetic material of the rotor lamination layers, at least in the radial direction of the reluctance rotor.

The intermediate part may in turn act as a magnetically active component, i.e. it may be formed from ferromagnetic material. According to one embodiment, however, the intermediate part is formed from a non-ferromagnetic material so that the separators do not impair the reluctance of the rotor.

By means of the casting compound the rotor lamination layers and the intermediate part are connected together in the radial direction via a positive connection.

According to one advantageous development, the casting compound is also electrically conductive. 'Electrically conductive' is understood here in particular that a conductance is greater than 10 S/m, in particular greater than 1000 S/m. An electrically conductive casting compound may advantageously be used for providing a starting cage for an asyhchronous starting of the reluctance rotor.

In this case a further advantage results if one respective end ring is also integrally formed at one axial end or at both axial ends of the reluctance rotor from the casting compound. Then the squirrel cage may be entirely modeled by means of the casting compound.

In the case where the casting compound is electrically conductive it is preferably formed from aluminum or an aluminum alloy or a plastics material with electrically conductive filler, for example electrically conductive fibers, such as for example carbon nanotubes or an electrically conductive granulate.

An electrically insulating and yet mechanically stable casting compound may be provided by means of a fiber-filled plastics material, for example glass fiber-filled plastics material or a fiber-filled resin.

The end ring already described has, in addition to the electrical conductivity, the further advantage that it acts as a clamping element which, in cooperation with the casting compound located in the laminated core, holds together the rotor lamination layers. In this connection, however, the invention provides that a ring is not provided at one axial end or at both axial ends of the reluctance rotor but in each case only one clamping element is integrally formed from the casting compound. This may then produce the retaining force for the rotor lamination layers, independently of an annular shape. For example, pins which are separated from one another for the individual flux barriers may be integrally formed as a clamping element at one axial end. The diameter of each clamping element is preferably greater in the radial direction than the radial dimension of the flux barrier so that the clamping element bears against one edge of the flux barrier in a bearing region or overlapping region.

As already described, the reluctance motor may have further flux barriers in the rotor lamination layers, wherein further recesses and separators of the intermediate part may be arranged in the intermediate part, preferably in each case in pairs between one of the flux barriers of an adjacent rotor lamination layer and one of the flux barriers of the other adjacent rotor lamination layer and, as a result, the delimited further spaces are cast with the casting compound.

It may also be provided that the reluctance motor comprises at least one further intermediate part of the aforementioned type, arranged in each case between two of the rotor lamination layers. By the number of intermediate parts used, the mechanical stability of the reluctance rotor may be adjusted in a targeted manner in order to strengthen said reluctance rotor for a designated rotational speed in a reluctance motor.

Accordingly a reluctance motor, i.e. an electric machine, also forms part of the invention, with an embodiment of the reluctance rotor according to the invention, wherein the reluctance motor comprises a stator with coils for rotating the reluctance rotor at a rotational speed by an alternating supply of current to the coils.

Accordingly a reluctance motor, i.e. an electric machine, also forms part of the invention, with an embodiment of the reluctance rotor according to the invention and with a three-phase current source for an alternating supply of current to the coils of a stator of the reluctance motor, wherein the three-phase current source is designed to rotate the reluctance rotor, by the alternating supply of current, at a speed which is greater than 5000 rpm. The reluctance motor according to the invention is suitable, due to its high rotational speed, as a drive motor for an electrically driven motor vehicle.

Accordingly, a motor vehicle also forms part of the invention, with an embodiment of the reluctance motor according to the invention which is designed as a drive for moving the motor vehicle. The motor vehicle according to the invention is designed, in particular, as an automobile, such as for example a passenger motor vehicle.

BRIEF DESCRIPTION OF THE DRAWING

Exemplary embodiments of the invention are described hereinafter. In the drawings.

The exemplary embodiments described hereinafter are preferred embodiments of the invention. In the exemplary embodiments, however, the disclosed components of the embodiments in each case represent individual features of the invention to be considered independently of one another, which in each case also develop the invention independently of one another and thus may also be regarded individually, or in a different combination from that shown, as a component of the invention. Moreover, the disclosed embodiments are also able to be complemented by further features of the invention which have already been disclosed.

DETAILED DESCRIPTION OF PREFERRED EMBODIMENTS

Figure 1:
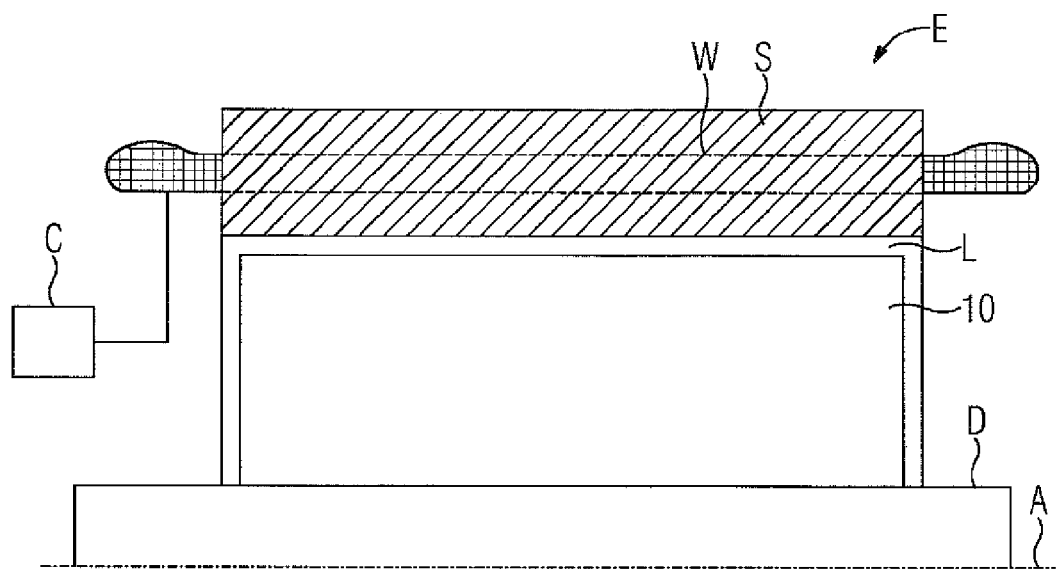
FIG. 1 shows a schematic view of a cross section of an embodiment of the reluctance motor according to the invention.

An electric machine E which is a reluctance motor is shown in FIG. 1. In FIG. 1, a rotational axis A also represents an axis of symmetry of the drawing. The electric machine E comprises a stator S, windings W of electrical coils being arranged therein, wherein in FIG. 1 only one of the windings W is shown. The windings W are alternately supplied with current by a three-phase current source C, whereby in the interior of the stator S a magnetic rotating field is produced in an air gap L of the electric machine E. The three-phase current source C may, for example, be an inverter or fixed-frequency electrical supply network.

A rotor 10, which is connected fixedly in terms of rotation to a shaft D, is located in the interior of the stator S. The shaft D is rotatably mounted in the stator S about the rotational axis A. The rotor 10 is an embodiment of the reluctance rotor according to the invention.

Figure 2:
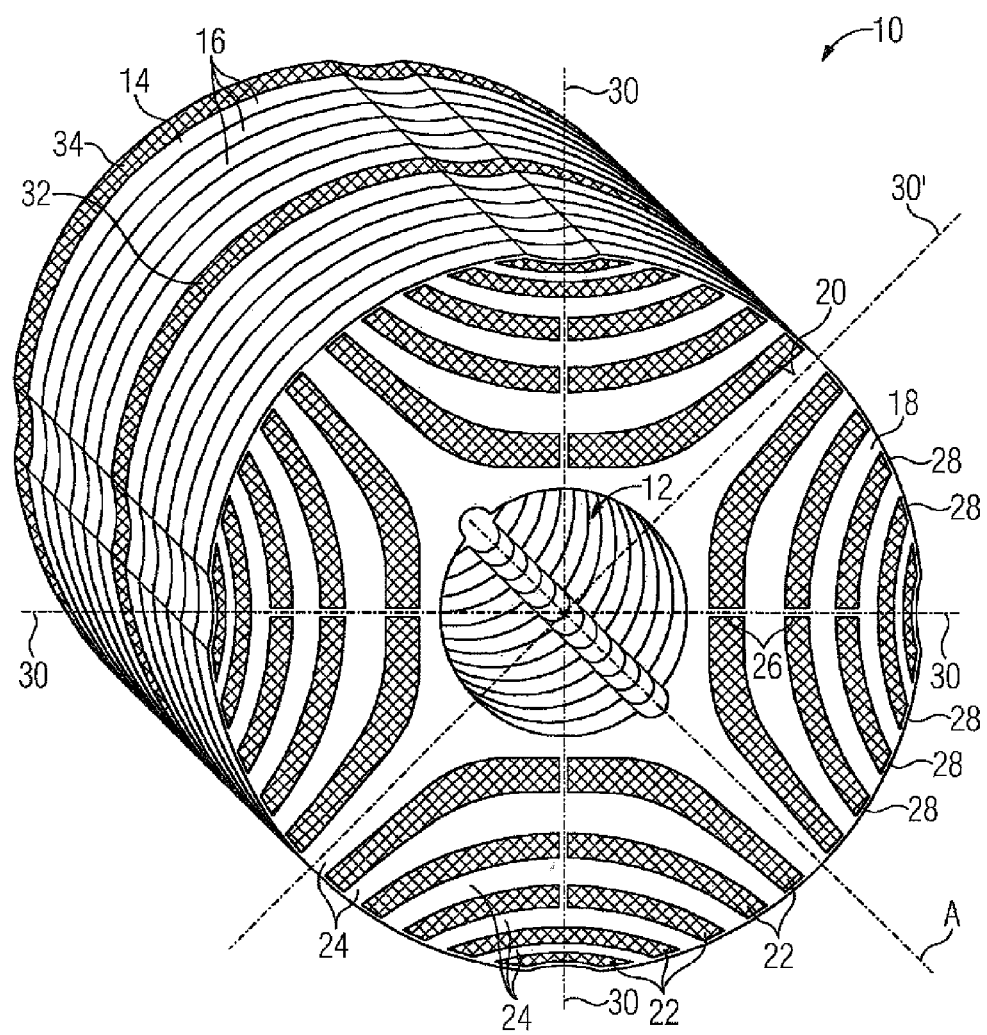
FIG. 2 shows a schematic view of a perspective view of an embodiment of the reluctance rotor of the reluctance motor of FIG. 1 according to the invention.
Figure 3:
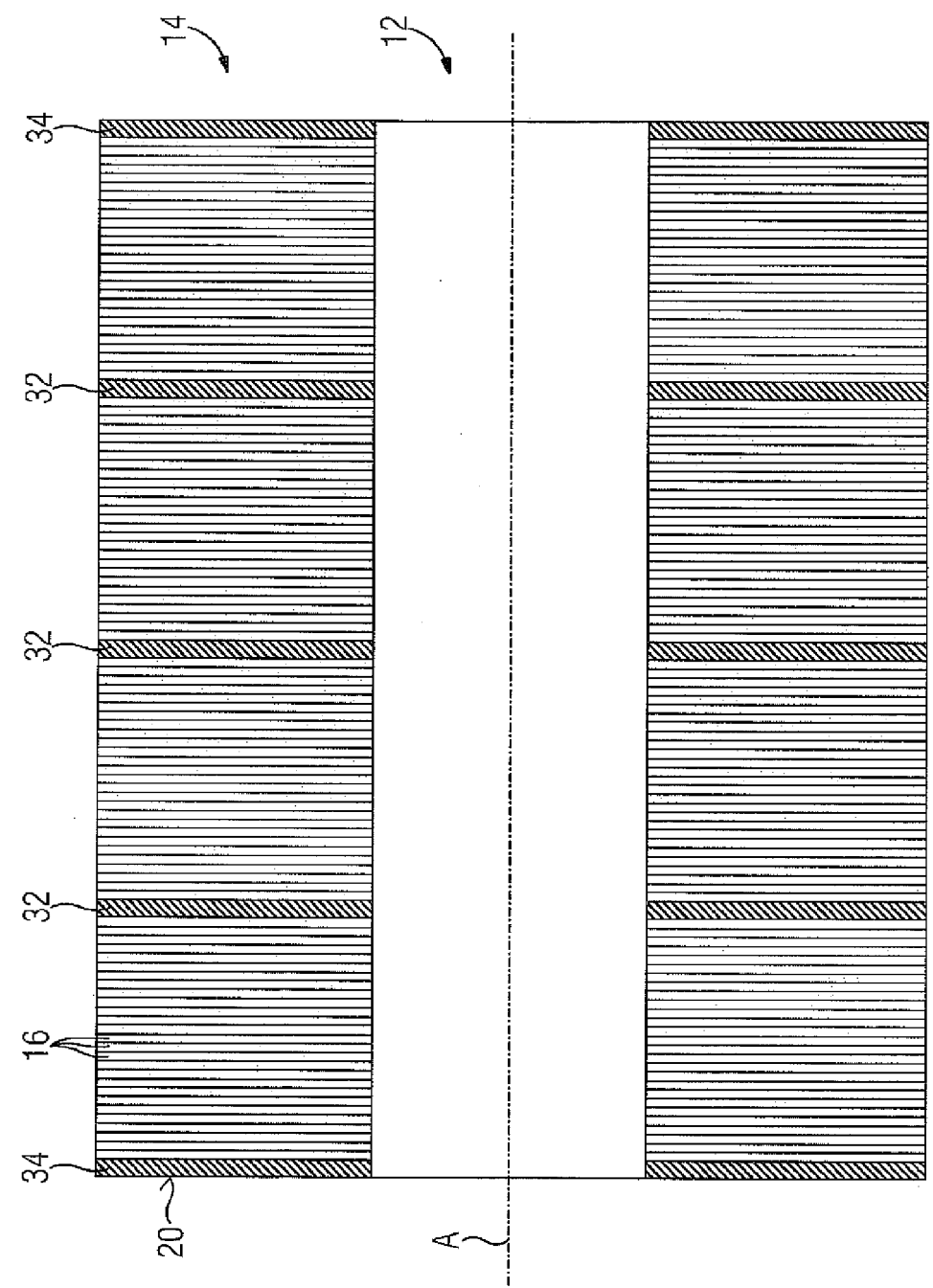
FIG. 3 shows a schematic view of a longitudinal section of the reluctance rotor of FIG. 2.

In FIG. 2 and FIG. 3 in each case the rotor 10 is shown separately.

The shaft D (no longer shown in FIG. 2) is inserted through a through-opening 12 of the rotor 10. A diameter of the rotor 10 in the radial direction relative to the rotational axis A may be more than 20 cm. A length of the rotor 10 in the axial direction may be more than 30 cm.

The rotor 10 has a laminated core 14 as a magnetically active part, which is formed from a plurality of rotor lamination layers or, in short, layers 16 which in each case have ferromagnetic, in particular soft magnetic, material. For the sake of clarity in FIG. 2 only some of the magnetic layers 16 are provided with a reference numeral. In each case, in a manner known per se, an electrically insulating layer may be located between the layers in order to block eddy currents in the laminated core 14. Each layer 16 is formed in the example shown in FIG. 2 by one respective rotor lamination 18. In FIG. 2, only the rotor lamination 18 which is located on a front face 20 in the axial direction along the axis A on a front axial end of the laminated core 14 is provided with a reference numeral. The rotor lamination 18 (and correspondingly also the remaining rotor laminations of the remaining layers 16) has recesses 22 which form barriers for a magnetic flux, i.e. flux barrier regions or flux barriers. The recesses 22 may be formed, for example, by stamping out corresponding shapes from the rotor lamination 18.

Of the rotor lamination 18, therefore, only the flux-conducting portions 24 and separators 26 for mechanically connecting the flux-conducting portions 24 and an outer ring 28 for mechanically connecting the flux-conducting portions 24 are made from the ferromagnetic material. The rotor laminations of the layers 16 may all have the same shape.

By means of the flux-conducting portions 24 in the rotor 10 a magnetic flux, which is produced by electric coils of the stator S, is conducted transversely to the q-axes 30 of the rotor 10 in a preferred magnetic direction. The d-axes 30' of the reluctance rotor extend in the known manner between the q-axes.

The rotor lamination layers 18 may be arranged in the laminated core 14, axially aligned one behind the other, such that the recesses 22 and accordingly also the flux-conducting portions 24 are axially aligned or at least rotated to such a small extent relative to one another that together they form a hollow space. The recesses 22 of all of the rotor laminations 18 arranged one behind the other then form as a whole continuous channels or spaces in the laminated core 14, a casting compound made from a non-ferromagnetic material being able to be located therein.

A rotor cage which also permits the rotor 10 to be driven asynchronously to the magnetic rotating field of the stator S, i.e. with slip, may be integrated in the rotor 10. In this case the cage bars of the rotor cage may be formed in the channels by an electrically conductive material, for example aluminum or an aluminum alloy, being provided as the casting compound.

An intermediate part 32 may be arranged between two of the layers 16 in the laminated core 14. The intermediate part 32 may be designed as a cylindrical disk and may be manufactured, for example, from the same material as the rotor laminations or from a non-ferromagnetic material, such as for example aluminum or an aluminum alloy or a plastics material. In addition to the intermediate part 32 shown, one or more further intermediate parts may be arranged between in each case two of the layers 16. A mechanical stabilizing of the laminated core 14 is effected by the intermediate parts 32.

Two end disks 34 may be provided on the two front faces, i.e. the front face 20 and the axially opposing end of the laminated core 14. The front disk 34, which is located on the front face 20, is not shown in FIG. 2 in order to be able to show the structure of the rotor lamination 18. It may be provided that only the end disks 34 which are located axially externally on the laminated core ends are electrically conductive, and one or more intermediate disks 32 in the laminated core are made of an electrically insulating material.

The end disks 34 may be formed from the casting compound which is also located in the disclosed shafts. As a result, production in one operating step is possible. The casting compound may have been introduced into the recesses 22 and into the region of the end disks 34, for example, by means of an injection-molding method or die-casting method, after the rotor laminations 18 have been pulled on, i.e. arranged in series.

Figure 4:
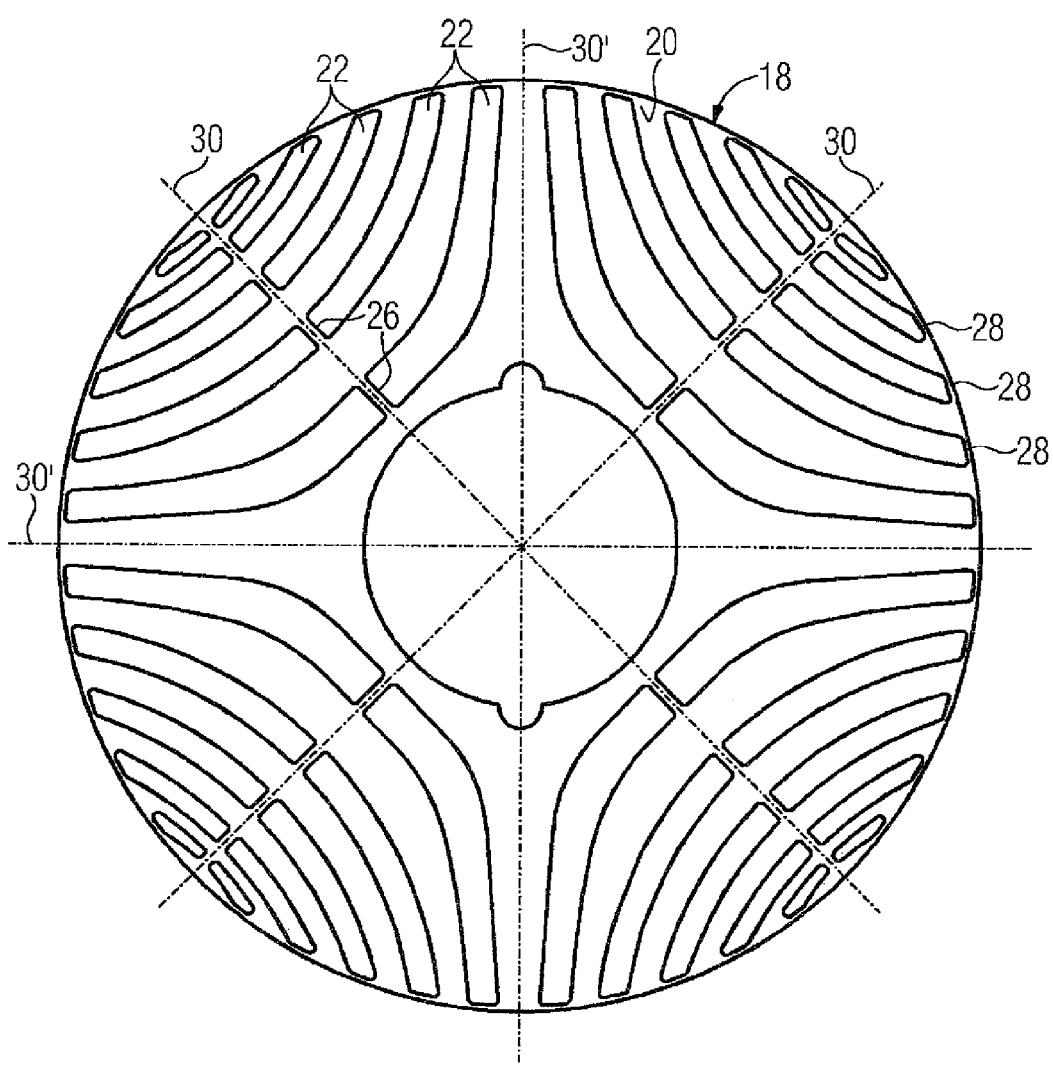
FIG. 4 shows a schematic view of a rotor lamination layer of a laminated core of the reluctance rotor of FIG. 2.
Figure 5:
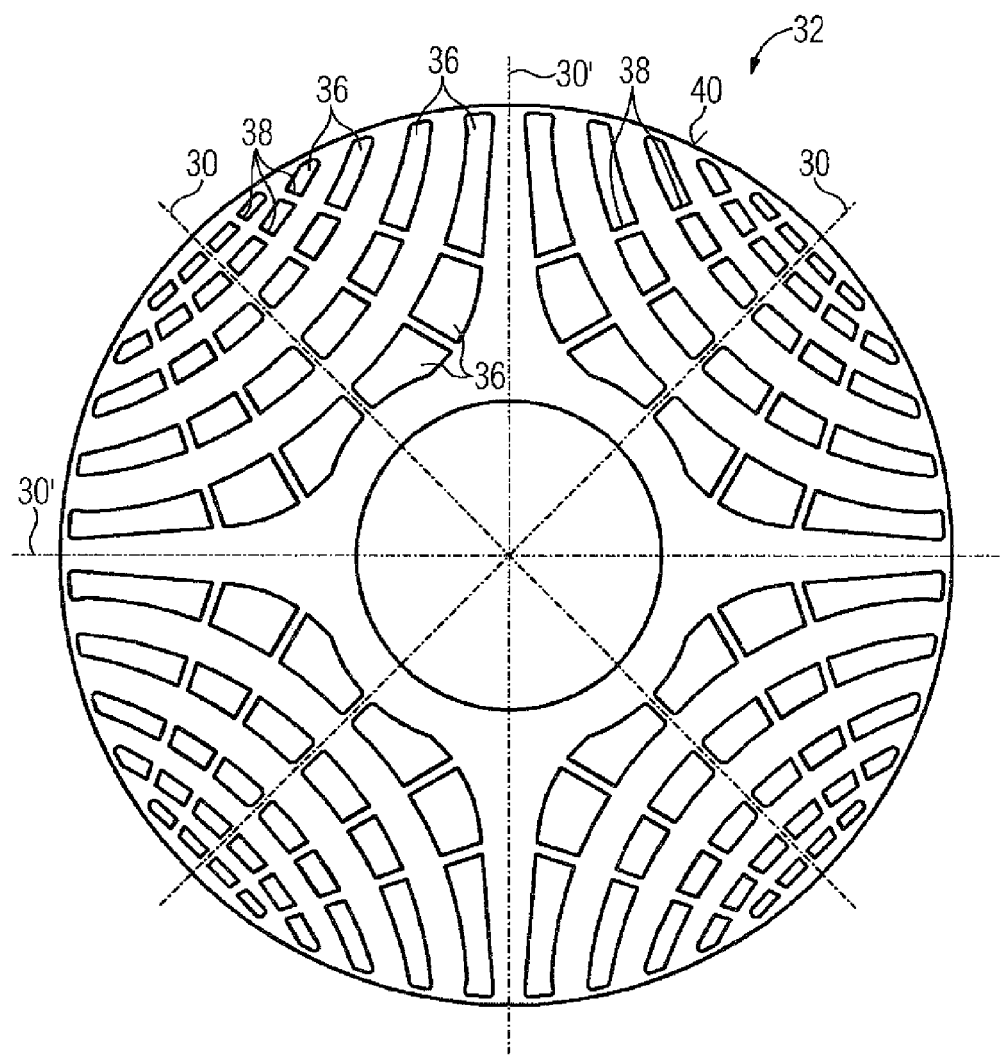
FIG. 5 shows a schematic view of an intermediate part of the reluctance rotor of FIG. 2.

In FIG. 4 an individual rotor lamination 18 is shown. In FIG. 5 for comparison a front view of the intermediate part 32 is shown.

Recesses 36 are also provided in the intermediate part 32 in the region of the recesses 22 of the rotor lamination 18. In contrast to the rotor lamination 18, however, it is provided that the intermediate part 32 has more and/or wider separators 38 than the separators 26 of the rotor lamination 18. Also in FIG. 5 for the sake of clarity only some of the recesses 36 and the separators 38 are provided with reference numerals.

Due to its separators 38 the intermediate part 32 is more mechanically stable relative to centrifugal forces which act on the laminated core 14 when the rotor 10 rotates about the rotational axis A. The separators 38 enclose at least one acute angle with the respective d-axis or extend parallel thereto, wherein in each case the same d-axis 30 acts as a reference axis which extends in the same segment as the separator 38. The separators 38 are radially aligned with their longitudinal extent relative to one respective portion of the outer circumference 40 of the laminated core 14.

The recesses 36 and the recesses 22 are arranged axially aligned, i.e. they form together a space which is cast with the casting compound. As a result, the rigid casting compound acts as a positive connecting element, centrifugal forces being able to be transmitted thereby from the layers 16 to the intermediate part 32.

In FIG. 6 to FIG. 11, in each case it is shown how clamping elements 42, 44, 46 may be integrally formed on the axial ends of the laminated core 14 by means of the casting compound, the layers 16 and the intermediate part 32 being fixed thereby in the axial direction.

Figure 6:
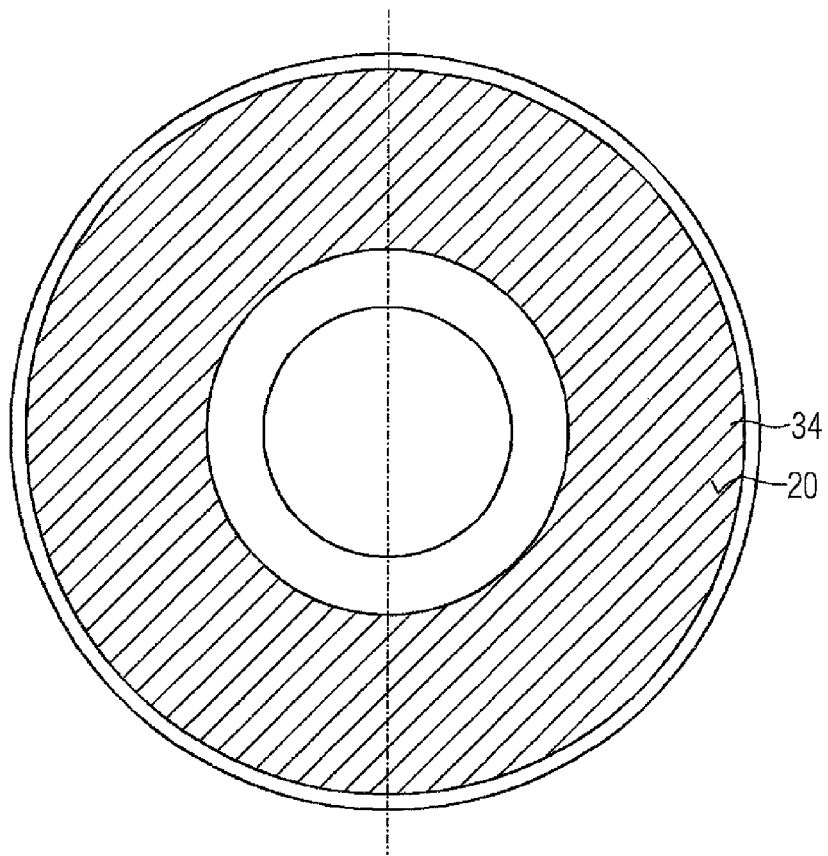
FIG. 6 shows a schematic front view of an axial end of an embodiment of the reluctance rotor according to the invention.
Figure 7:
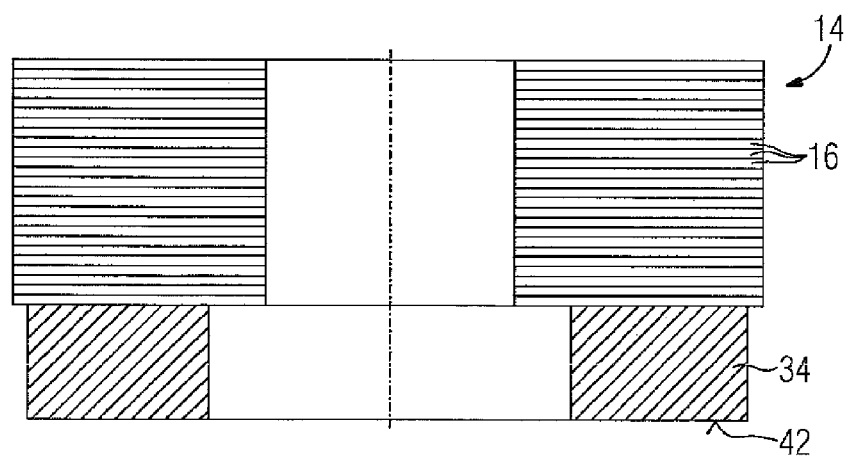
FIG. 7 shows a schematic side view of the reluctance rotor of FIG. 6.

In FIG. 6 and FIG. 7 it is shown how an end ring as an end disk 34 may be cast as a clamping element 42, by means of an electrically conductive casting compound. Since the casting compound in the channels in the interior of the laminated core 14 is also electrically conductive, a rotor cage for asynchronous starting of the rotor 10 is provided as a whole by the material connection of the entire casting compound.

Figure 8:
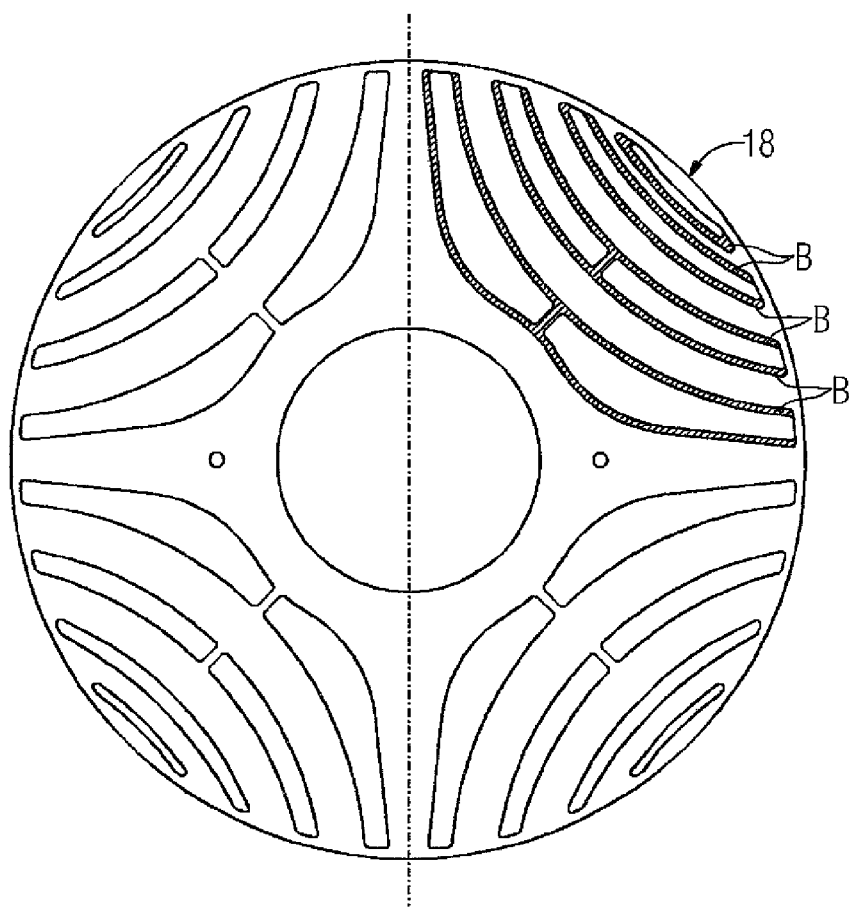
FIG. 8 shows a schematic front view of an axial end of a further embodiment of the reluctance rotor according to the invention.
Figure 9:
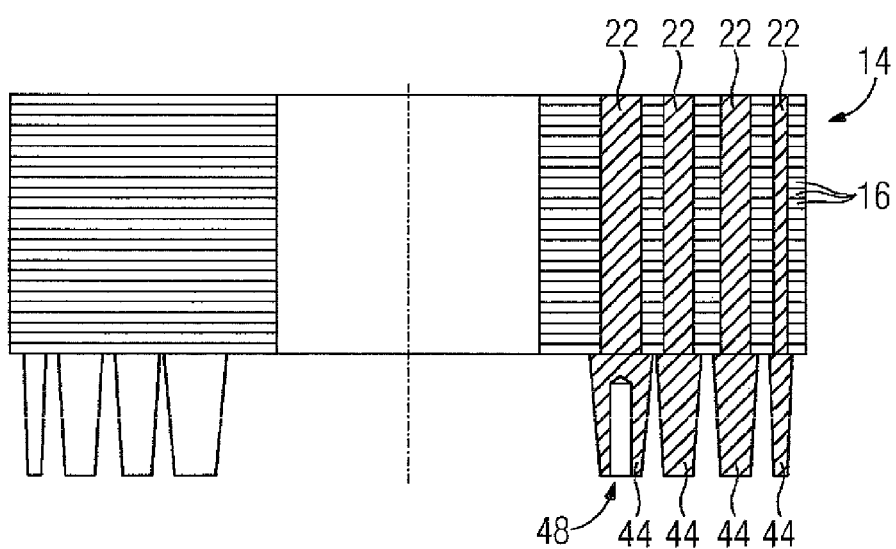
FIG. 9 shows a schematic side view of the reluctance rotor of FIG. 8.

In FIG. 8 and FIG. 9 clamping elements 44 configured separately from one another are shown, each clamping element thereof being formed from casting compound which protrudes from one of the channels. The clamping elements 44 are located in an overlapping region B on the laminated core 18 at the axial end. In other words, the clamping elements 44, in particular in the radial direction, have a larger diameter than the channels of the recesses 22. As a result, a compressive force may be transmitted from the clamping elements 44 to the rotor lamination 18. By the provision of blind holes 48 in a clamping element 44 weight may be removed and, as a result, the rotor 10 balanced.

Figure 10:
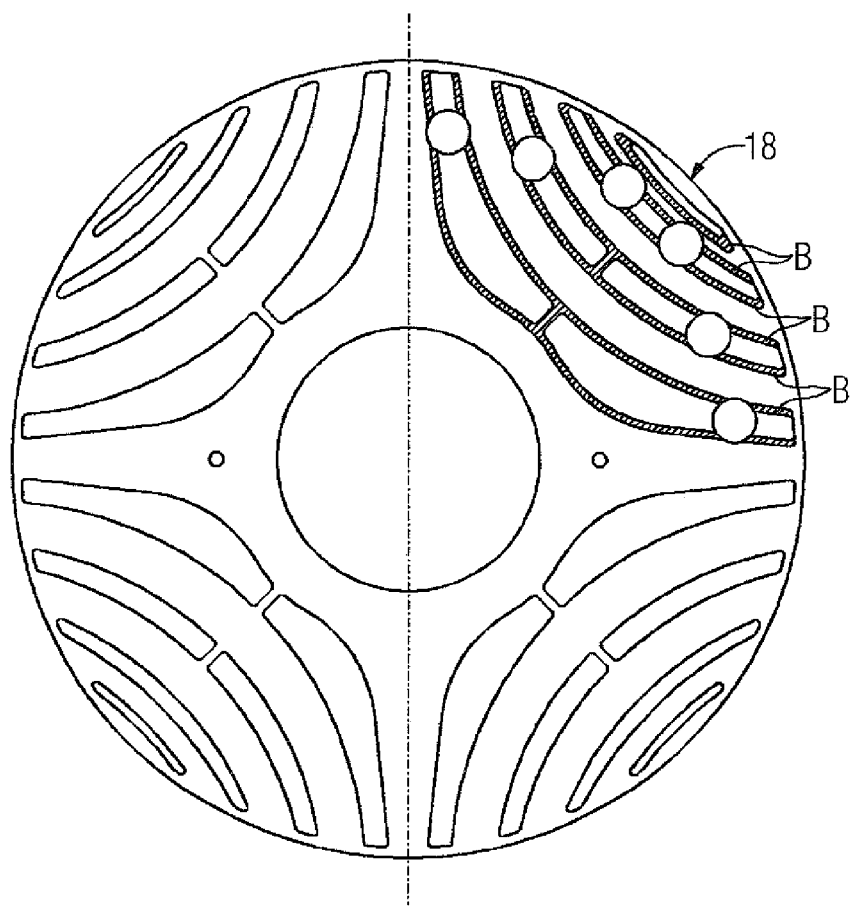
FIG. 10 shows a schematic front view of an axial end of a further embodiment of the reluctance rotor according to the invention and FIG. 11 shows a schematic side view of the reluctance rotor of FIG. 10.
Figure 11:
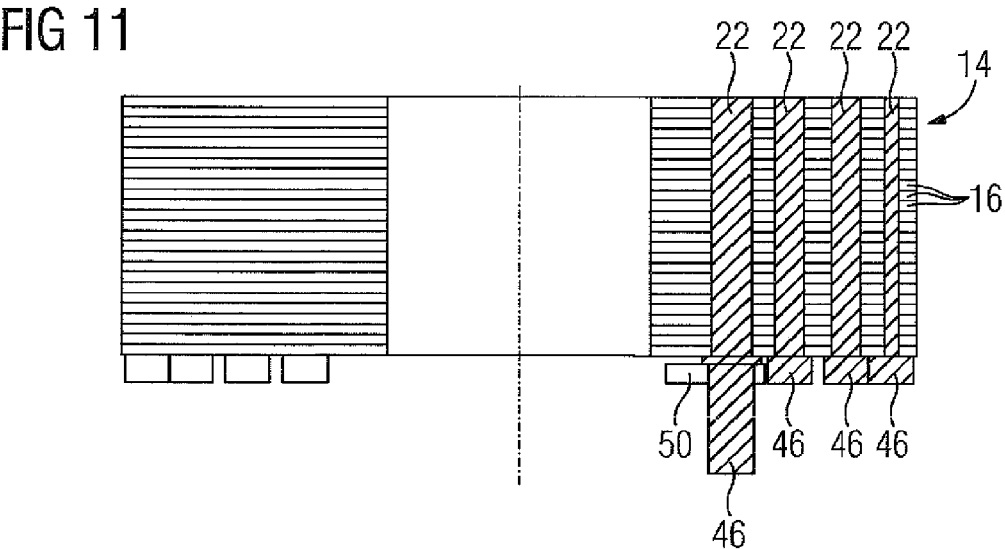

In the embodiment shown in FIG. 10 and FIG. 11, for weight saving, individual heads or pins are formed from the casting compound as clamping elements 46. These heads or pins also have a diameter which is larger than the individual recesses 22 against which they bear. As a result, once again an overlapping region B is produced, in which the clamping elements 46 exert compressive stress on the layers 16 and as a result fix the laminated core 14. Weights 50 may be placed on the clamping elements 46 in order to balance the rotor 10. To this end, the clamping elements 46 may be configured to be wedge-shaped or to taper in the longitudinal extent.

The exemplary embodiments show the principle according to the invention that, for stabilizing the rotor 10, preferably non-magnetic intermediate parts 32 are inserted over its entire rotor lamination length at specific spacings. 'Non-magnetic' is understood here, in particular, as not ferromagnetic and quite particularly not soft magnetic. Non-magnetic laminations, with a tensile strength which is as high as possible, which also have thermal resistance to a die-casting process or, injection-molding process for introducing the casting compound and withstand the closing force of the injection-molding or die-casting machine are preferred.

The intermediate parts 32 contain recesses 36 which preferably have a large surface area, i.e. overlap by more than 50 percent, in particular more than 70 percent, with the recesses 22 of the flux barriers, so that during casting connecting surfaces are produced from the two cast surfaces. As a result, a stabilizing cage is produced in the channels of the laminated core 14. The recesses 36 in the intermediate part 32 are matched in terms of geometry so that connecting surfaces which are as large as possible relative to the adjacent rotor lamination 18 are produced and at the same time the filling and/or casting with casting compound is possible in a simple manner. In this case, it is preferably provided to design the surfaces of the flux barriers and the surfaces in the intermediate part 32 to be equal in terms of contour.

Since each rotor lamination 18 in the direction of the q-axis 30 is very fragile, it is stabilized by means of the casting compound via the connecting surfaces to the intermediate part 32. Thus the rotor laminations 18 are supported against flaring in the case of centrifugal force.

In the intermediate part 32 additional separators 38 are arranged between the recesses 36 such that the forces produced in the case of centrifugal force may be absorbed. The centrifugal force of each rotor lamination 18 is also transmitted to the rigid casting compound in the cast surfaces of the rotor lamination 18. By means of the connecting surfaces this force is transmitted to the surfaces of the recesses 36 in the intermediate part 32. Finally, this force is absorbed by the bearing stress of the intermediate part 32. The intermediate part 32, in terms of geometry, is in turn able to absorb the applied forces.

Preferably aluminum or an aluminum alloy which is introduced by a die-casting method may serve as the casting compound. Similarly, fiber-filled plastics material or resin which are introduced by injection-molding or casting may be used as the casting compound.

The number of intermediate parts 32 is dependent on the core length of the rotor core 14 and the required rotational speed. The greater the number of intermediate parts 32, the greater the support achieved relative to centrifugal force and the greater the overall stability of the laminated core 14.

If an electrically conductive material is used as the casting compound, there is the possibility of casting end rings 42 at the rotor ends, whereby additionally a starting cage is formed. In this case, a closed contour which connects the individual surfaces of the flux barriers is attached at the two core ends.

There is also the possibility of using an electrically conductive casting compound, preferably an aluminum alloy, without forming end rings. In this case, the casting compound purely serves as a supporting function. There is no starting cage. In this case, separate contours 44, 46 are formed at the two core ends, said contours not connecting together the surfaces of the flux barriers. These contours are configured to be slightly larger in comparison with flux barrier surfaces, so that the rotor laminated core 14 is clamped in the axial direction in an overlapping region B. These cast bodies 44, 46 may be used for balancing. In this case, imbalances may be compensated either by positioning domes, i.e. by fixing the pin length of the support elements 44, 46 to the rotor laminations 18 or by caulking with weights 50 (positive balancing) or by bores 48 (negative balancing).

If a non-conductive material is used as the casting compound, this serves purely as a support element in any case.

By the provision of the intermediate parts 32 and the casting compound the relatively instable or fragile rotor laminations 18 may be stabilized with their flux barriers 22 relative to the corresponding rotational speed. The cast regions counteract the flaring of a rotor lamination 18.

Figure 12:
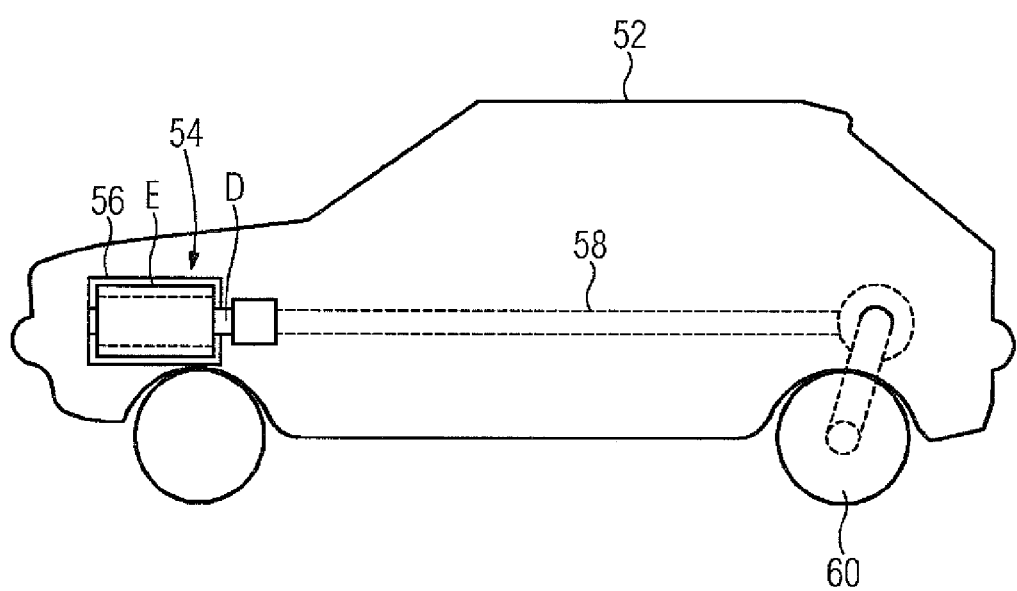
FIG. 12 shows a schematic view of an embodiment of the motor vehicle according to the invention.

A motor vehicle 52, which for example may be a passenger motor vehicle, is shown in FIG. 12 in a schematic view. The motor vehicle 52 has an electric drive motor 54, the electric machine E or a further embodiment of the reluctance motor according to the invention being able to be located in the housing thereof 56, for example. The shaft D of the electric machine E may be coupled, for example, to a drive train 58 of the motor vehicle 52. The drive train 58 may drive, for example, a rear wheel 60 of the motor vehicle 52.

Overall, therefore, it is advantageous that the rotational speed compatibility of the reluctance rotor according to the invention is increased. The separator width in the rotor laminations 18 on the external diameter, i.e. the annular width of the ring 28, should be selected to be as small as possible, in order to achieve thereby an efficiency which is as high as possible, since the magnetic flux is optimized in the laminated core. The outer ring 28 and the separators 26 may even be entirely dispensed with, i.e. it is possible to dispense with separators in the rotor lamination between the flux-conducting portions, since the casting compound fixes the individual rotor laminations produced thereby. As a result, an improved efficiency is also achieved. The laminated core 14 per se is reinforced by the casting compound which facilitates the machining of the outer circumference 40 of the laminated core 14. By the fixing action of the casting compound no further bandage is required along the outer circumference 40, so that the width of the air gap L between the rotor and the stator may be optimized. The rotor 10 also has an improved natural bending frequency due to the reinforcing of the entire combined structure which is formed by the shaft D and the laminated core 14. The corresponding rotational speed may be adjusted in a modular manner by the number of intermediate parts 32. The casting results in an integral laminated core 14 which may be handled as a single component, which simplifies the machining and assembly.

Overall, it is shown by the exemplary embodiments how by means of the invention a reluctance rotor may be provided with an intermediate part, for a high rotational speed with high levels of efficiency for an electrically driven motor vehicle (eCar).

The invention claimed is:

1. A reluctance rotor for an electric machine, comprising:
a laminated core including rotor lamination layers made of a ferromagnetic material, each rotor lamination layer having a flux barrier formed by a recess in the ferromagnetic material;
an intermediate part arranged between adjacent rotor lamination layers, said intermediate part including recesses and separators delimiting the recesses from one another, said recesses and separators being axially arranged between the flux barriers, thereby delimiting a space between the recesses of the intermediate part and the flux barriers;
a non-ferromagnetic casting compound received in the space; and
separate clamping elements formed from the casting compound at least at one axial end of the reluctance rotor, said clamping elements bearing against the axial end in an overlapping region on the laminated core and configured to hold together the rotor lamination layers in cooperation with the casting compound in the space.

2. The reluctance rotor of claim 1, wherein the separators are configured to divert a centrifugal force radially inwardly in the intermediate part, when the reluctance rotor rotates.

3. The reluctance rotor of claim 1, wherein each of the separators extends in its longitudinal extent toward an outer circumference of the reluctance rotor.

4. The reluctance rotor of claim 1, wherein each of the separators extends in its longitudinal extent at an acute angle or parallel to a q-axis of the reluctance rotor.

5. The reluctance rotor of claim 1, wherein the intermediate part is made of a material which has, at least in a radial direction, a tensile strength which is greater than a tensile strength of the ferromagnetic material of the rotor lamination layers.

6. The reluctance rotor of claim 1, wherein the intermediate part is formed from a non-ferromagnetic material.

7. The reluctance rotor of claim 1, wherein the casting compound is electrically conductive and is formed from a plastics material with an electrically conductive filler.

8. The reluctance rotor of claim 7, wherein the plastics material includes electrically conductive fibers or an electrically conductive granulate as the filler.

9. The reluctance rotor of claim 1, wherein the casting compound comprises aluminum, an aluminum alloy, a fiber-filled plastics material, or resin.

10. The reluctance rotor of claim 1, wherein at least one of the clamping elements includes a bore or a weight for balancing the reluctance rotor.

11. The reluctance rotor of claim 1, wherein the recesses and the separators of the intermediate part define together a total surface area of a contour which corresponds to a contour of the flux barrier of at least one of the adjacent rotor lamination layer.

12. The reluctance rotor of claim 1, wherein the rotor lamination layers each comprises further flux barriers, said intermediate part having further recesses and separators arranged in pairs between one of the flux barriers of one of the adjacent rotor lamination layers and one of the flux barriers of the other one of the adjacent rotor lamination layers, thereby delimiting further spaced which are cast with the casting compound.

13. The reluctance rotor of claim 1, further comprising at least one further said intermediate part arranged between two of the rotor lamination layers.

14. The reluctance rotor of claim 1, further comprising a stator having coils for rotating the reluctance rotor at a rotational speed by an alternating supply of current to the coils.

15. A motor vehicle, comprising a reluctance motor configured as a drive motor for moving the motor vehicle, said reluctance motor comprising a laminated core including rotor lamination layers made of a ferromagnetic material, each rotor lamination layer having a flux barrier formed by a recess in the ferromagnetic material, an intermediate part arranged between adjacent rotor lamination layers, said intermediate part including recesses and separators delimiting the recesses from one another, said recesses and separators being axially arranged between the flux barriers, thereby delimiting a space between the recesses of the intermediate part and the flux barriers, a non-ferromagnetic casting compound received in the space, separate clamping elements formed from the casting compound at least at one axial end of the reluctance rotor, said clamping elements bearing against the axial end in an overlapping region on the laminated core and configured to hold together the rotor lamination layers in cooperation with the casting compound in the space, and a stator having coils for rotating the reluctance rotor at a rotational speed by an alternating supply of current to the coils.

* * * * *